United States Patent Office 2,928,847
Patented Mar. 15, 1960

2,928,847

16-HALO-1,3,5(10)-ESTRATRIEN-17-ONES AND 17-OLS

William F. Johns, Morton Grove, Ill., assignor to G. D. Searle & Co., Chicago, Ill., a corporation of Delaware No Drawing. Application June 20, 1958
Serial No. 743,508

6 Claims. (Cl. 260—397.3)

The present invention relates to 16-halo-1,3,5(10)-estratriene derivatives which can be represented by the structural formula

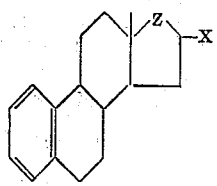

wherein X is a halogen and Z is selected from the group consisting of hydroxymethylene, (lower)alkanoyloxymethylene and carbonyl. Among the (lower)alkanoyl radicals which are suitable are particularly the acyl radicals of carboxylic acids such as acetyl, propionyl, butyryl, isobutyryl, valeryl, isovaleryl, hexanoyl, heptanoyl, and octanoyl.

The 16-chloro, 16-bromo- and 16-iodo-1,3,5(10)-estratrien-17-one derivatives of the present invention can be prepared by treating an appropriate 1,3,5(10),16-estratetraen-17-ol (lower)alkanoate with the desired halogen in an inert solvent such as carbon tetrachloride, destroying the excess halogen and isolating the product. As a specific example, reaction of 1,3,5(10),16-estratetraen-17-ol acetate with chlorine in carbon tetrachloride solution followed by destruction of excess chlorine with sodium bisulfite and isolation of the product affords 16α-chloro-1,3,5(10)-estratrien-17-one.

Suitable 1,3,5(10),16-estratetraen-17-ol alkanoates can be prepared by heating 1,3,5(10)-estratrien-17-one at about 150° for about 4 hours with the desired alkanoyl anhydride and p-toluenesulfonic acid and recovering the product. The 17-enol acetate is a particularly suitable intermediate and is prepared readily by the treatment of 1,3,5(10)-estratrien-17-one with isopropenyl acetate with a catalyst such as p-toluenesulfonic acid as described hereinafter.

The 16α-halogen-1,3,5(10)-estratrien-17-ones can be prepared also by treating 1,3,5(10),16-estratetraen-17-ol alkanoate with a halogenating agent such as N-halogensuccinimide, e.g. N-bromo, or N-iodosuccinimide, destroying the excess halogenating agent and isolating the product. As a specific example, reaction of 1,3,5(10),16-estratetraen-17-ol acetate with N-iodosuccinimide in dioxane solution followed by destruction of excess iodine with sodium thiosulfate and isolation of the product affords 16α-iodo-1,3,5(10)-estratrien-17-one. The same compound is obtained by the use of iodine in carbon tetrachloride solution.

16α-fluoro-1,3,5(10)-estratrien-17-one can be made by treating the corresponding 16-iodo compound with silver fluoride in a solvent such as acetonitrile. After the reaction is complete, the precipitated silver salts are removed, the solvent removed in vacuo and the product collected and purified.

The 16α-halo-1,3,5(10)-estratrien-17-ol derivatives of the present invention can be prepared by treating the desired 16-halo-1,3,5(10)-estratrien-17-one with a reducing agent such as lithium aluminum hydride or sodium borohydride and isolating the product. As a specific example, reaction of 16α-chloro-1,3,5(10)-estratrien-17-one in tetrahydrofuran with lithium aluminum hydride followed by destruction of the excess lithium aluminum hydride with acid and isolation of the product affords 16α-chloro-1,3,5(10)-estratrien-17-ol. Esterification of the 17-hydroxyl radical is accomplished by treatment with the desired (lower)alkanoic acid anhydride and pyridine at room temperature followed by isolation and recovery of the product.

The processes by which the compounds of the invention are made can lead to the formation of stereoisomeric products. In actual practice it is found that one of the stereoisomers predominates and that upon subjecting the crude reaction product to recrystallization, the crystalline product obtained consists substantially of a single stereoisomer which has been designated the "α" isomer in the examples. A determination of the stereochemical configuration of the predominant isomer is not necessary in the identification of the compounds or in employing the claimed compositions in their intended applications. The β-isomers can be prepared by treating 16α-iodo-1,3,5(10)-estratrien-17-one with a lithium halide. As a specific illustration, treatment of 16α-iodo-1,3,5(10)-estratrien-17-one in dimethylformamide with lithium iodide at room temperature affords the 16β-iodo isomer.

The compounds of the present invention are useful because of their valuable pharmacological properties. Broadly, their usefulness can be said to result from the fact that they exhibit certain of the biological characteristics which are associated with the natural estrogenic hormones, while at the same time they exhibit remarkably little estrogenic activity. It is well known that certain applications of estrogenic hormones such as estrone and estradiol are limited and in many cases made entirely impractical because of the estrogenic effects they produce. One of these applications is in the treatment of degenerative diseases associated with abnormal cholesterol metabolism and deposition. It is recognized that estrogenic hormones exhibit an inhibitory and consequently beneficial effect on the arterial deposition of cholesterol and it is widely agreed that this so-called anti-atherogenic effect is achieved by a reduction in the serum ration of cholesterol to phospholipids. This result is commonly, but not necessarily, accompanied both by a reduction in the serum concentration of cholesterol and an increase in the serum concentration of phospholipids. The reduction in the serum ratio of cholesterol can be designated as a "lipid effect" and regarded as a measure of anti-atherogenic activity; and for any particular compound quantitative comparisons can be made between this effect and the estrogenic effect associated therewith. It has been found that in the compositions of the present invention the ratio of the lipid effect to the estrogenic effect has been markedly increased over the corresponding ratios which are characteristic of the natural estrogenic hormones.

The invention will appear more fully from the examples which follow. These examples are set forth by way of illustration only and it will be understood that the invention is not to be construed as limited in spirit or in scope by the details contained therein as many modifications in materials and methods will be apparent from this disclosure to those skilled in the art. In these examples temperatures are given in degrees centigrade (° C.). Quantities of materials are expressed in parts by weight and in parts by volume which bear the same relation one to the other as kilograms to liters.

EXAMPLE 1

16α-chloro-1,3,5(10)-estratrien-17-one

A solution of 10.8 parts by weight of 1,3,5(10)-estratrien-17-one in 400 parts by volume of isopropenyl acetate containing 4.0 parts by weight of p-toluenesulfonic acid is distilled slowly for 18 hours. The solution is cooled and diluted with benzene. Excess aqueous potassium carbonate is added and the mixture extracted with benzene, the benzene extracts washed with water, dried over magnesium sulfate and the solvent removed in vacuo. The residue is dissolved in hexane and chromatographed quickly over fuller's earth (sold under the trade name Florex). The chromatographic column is eluated with 2000 parts by volume of hexane, the solvent removed from the eluate in vacuo to yield 1,3,5(10),16-estratetraen-17-ol acetate which, after recrystallization from hexane melts at 108–111°.

A solution of 1.23 parts by weight of 1,3,5(10),16-estratetraen-17-ol acetate in 15 parts by volume of carbon tetrachloride and 10 parts by weight of anhydrous potassium carbonate is stirred vigorously at 10–15° and to this solution is added during five minutes, 0.34 part by weight of chlorine dissolved in 30 parts by volume of carbon tetrachloride. Excess aqueous sodium thiosulfate is added and the solution is extracted with chloroform. The chloroform extract is washed with water, dried over magnesium sulfate and the solvent removed in vacuo. The residue is crystallized from methanol to yield 16α-chloro-1,3,5(10)-estratrien-17-one, which melts at 163–164°, exhibits a specific rotation of +166.5° in chloroform and exhibits an absorption maximum in the infrared spectrum at 5.72 microns.

By substituting an equivalent quantity of bromine for the chlorine used above and otherwise proceeding as described, 16α-bromo-1,3,5(10)-estratien-17-one is obtained which melts at 163–166°, exhibits a specific rotation of +126° in chloroform and which exhibits an absorption maximum in the infrared at 5.73 microns.

EXAMPLE 2

16α-iodo-1,3,5(10)-estratrien-17-one

A solution of 1.4 parts by weight of 1,3,5(10),16-estratetraen-17-ol acetate in 50 parts by volume of acetic acid containing 0.8 part by weight of mercuric acetate at 15° is treated with a solution of 1.3 parts by weight of iodine in 200 parts by volume of acetic acid with stirring. The solution is stirred for an additional 10 minutes and is then poured into excess aqueous potassium iodide. The mixture is extracted with benzene and the extract washed successively with aqueous sodium thiosulfate, water and aqueous potassium bicarbonate solution. The solution is dried over magnesium sulfate and the solvent removed in vacuo. The residue is crystallized from acetone-ether and recrystallized from methanol to yield 16α-iodo-1,3,5(10)-estratrien-17-one which melts at 190–193° and exhibits a specific rotation of +85.3° in chloroform.

EXAMPLE 3

16α-chloro-1,3,5(10)-estratrien-17-ol

To a slurry of 0.2 part by weight of lithium aluminum hydride in 25 parts by volume of ether is added with stirring while cooling to 0°, a solution of 1.0 part by weight of 16α-chloro-1,3,5(10)-estratrien-17-one in 15 parts by volume of tetrahydrofuran. The solution is stirred for 10 minutes and then water and dilute hydrochloric acid are added cautiously. The mixture is extracted with benzene, the extract washed successively with water and potassium bicarbonate solution and dried over magnesium sulfate. The solvent is removed in vacuo and the residue is dissolved in 20 parts by volume of hexane and then chromatographed on 50 parts by weight of fuller's earth. The chromatographic column is washed with 500 parts by volume of hexane and eluted with 2000 parts by volume of 5% benzene in hexane. The solvents are removed from the eluate and the residue crystallized from hexane to yield 16α-chloro-1,3,5(10)-estratrien-17α-ol which melts at 179–180° and exhibits a specific rotation of +68° in chloroform.

The chromatographic column is washed with 1000 parts by volume of 10% benzene in hexane and eluted further with 2000 parts by volume of 20% benzene in hexane. The solvent is removed from the eluate in vacuo and the residue crystallized from hexane to yield 16α-chloro-1,3,5(10)-estratrien-17β-ol which melts at 114–115° and exhibits a specific rotation of +79° in chloroform.

By substituting an equivalent quantity of 16α-bromo-1,3,5(10)-estratrien-17-one for the chloro- analog used above and otherwise proceeding as described above, the corresponding bromo- analogs are obtained: 16α-bromo-1,3,5(10)-estratrien-17α-ol which melts at 168–169°, and exhibits a specific rotation of +74° in chloroform; and 16α-bromo-1,3,5(10)-estratrien-17β-ol which melts at 100–101° and exhibits a specific rotation of +77° in chloroform.

EXAMPLE 4

16β-chloro-1,3,5(10)-estratrien-17-one

A solution of 2.5 parts by weight of 16α-iodo-1,3,5(10)-estratrien-17-one in 100 parts by volume of dimethylformamide containing 8.0 parts by weight of lithium chloride is stirred at room temperature for 6 hours. The solution is diluted with water and filtered. Recrystallization from methanol yields 16β-chloro-1,3,5(10)-estratrien-17-one.

Substitution of an equivalent quantity of lithium bromide for the lithium chloride and otherwise proceeding as described above, affords 16β-bromo-1,3,5(10)-estratrien-17-one.

EXAMPLE 5

16α-fluoro-1,3,5(10)-estratrien-17-one

A solution of 4.8 parts by weight of 16α-iodo-1,3,5(10)-estratrien-17-one in 125 parts by volume of acetonitrile is heated at reflux for 16 hours in a Soxhlet apparatus containing 25 parts by weight of silver fluoride. The mixture is cooled to room temperature, the suspended silver salts removed by filtration and the filtrate diluted with 250 parts by volume of chloroform, the resulting solution washed thoroughly with water and dried over anhydrous magnesium sulfate. The magnesium sulfate is removed by filtration and the filtrate evaporated to dryness in vacuo. The residue is dissolved in 25 parts by volume of benzene and 50 parts by volume of petroleum ether and chromatographed over a column of 30 parts by weight of magnesia silica gel adsorbent (known as Florisil). The chromatographic column is eluted with 1000 parts by volume of 75% benzene and petroleum ether, the solvents removed from the eluate in vacuo and the residue crystallized from benzene-petroleum ether to yield 16α-fluoro-1,3,5(10)-estratrien-17-one.

EXAMPLE 6

16α-chloro-1,3,5(10)-estratrien-17β-ol acetate

A solution of 2 parts by weight of 16α-chloro-1,3,5(10)-estratrien-17β-ol in 40 parts by volume of pyridine and 20 parts by volume of acetic anhydride is heated at 100° for 30 minutes. The mixture is cooled and diluted with 400 parts by volume of water. The solid which precipitates is collected, washed with water, dried and recrystallized from aqueous acetone to yield 16α-chloro-1,3,5(10)-estratrien-17β-ol acetate which exhibits a specific rotation of +6° in chloroform and an absorption maximum in the infrared spectrum at 5.73 microns.

What is claimed is:
1. A compound of the formula
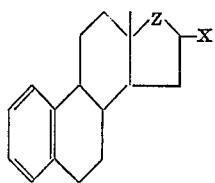
wherein X is a halogen and Z is selected from the group consisting of hydroxymethylene, lower alkanoyloxymethylene and carbonyl.
2. 16-chloro-1,3,5(10)-estratrien-17-one.
3. 16-bromo-1,3,5(10)-estratrien-17-one.
4. 16-iodo-1,3,5(10)-estratrien-17-one.
5. 16-chloro-1,3,5(10)-estratrien-17-ol.
6. 16-bromo-1,3,5(10)-estratrien-17-ol.
No references cited

UNITED STATES PATENT OFFICE
CERTIFICATE OF CORRECTION

Patent No. 2,928,847                                March 15, 1960

William F. Johns

It is hereby certified that error appears in the printed specification of the above numbered patent requiring correction and that the said Letters Patent should read as corrected below.

Column 3, line 14, for "eluated" read -- eluted --; line 18, for "108-111°" read -- 109-111° --; line 36, for "estratien" read -- estratrien --.

Signed and sealed this 6th day of September 1960.

(SEAL)
Attest:

ERNEST W. SWIDER
Attesting Officer

ROBERT C. WATSON
Commissioner of Patents